United States Patent
Archambault (10) Patent No.: US 10,118,236 B2
(45) Date of Patent: Nov. 6, 2018

(54) ROTARY CUTTING TOOL

(71) Applicant: Kennametal Inc., Latrobe, PA (US)

(72) Inventor: Steven P. Archambault, Rahway, NJ (US)

(73) Assignee: KENNAMETAL INC., Latrobe, PA (US)

( * ) Notice: Subject to any disclaimer, the term of this patent is extended or adjusted under 35 U.S.C. 154(b) by 791 days.

(21) Appl. No.: 14/497,768

(22) Filed: Sep. 26, 2014

(65) Prior Publication Data

US 2016/0089728 A1   Mar. 31, 2016

(51) Int. Cl.
*B23C 5/10* (2006.01)

(52) U.S. Cl.
CPC ........ *B23C 5/10* (2013.01); *B23C 2210/0485* (2013.01); *B23C 2210/088* (2013.01); *B23C 2210/54* (2013.01); *B23C 2220/605* (2013.01)

(58) Field of Classification Search
CPC ........ B23C 2220/605; B23C 2210/088; B23C 2210/0485; B23C 2210/54; B23C 2210/086; B23C 2210/0486; B23C 2260/80

See application file for complete search history.

(56) References Cited

U.S. PATENT DOCUMENTS

| | | | | |
|---|---|---|---|---|
| 1,840,852 A | * | 1/1932 | Schotthoefer | B23C 5/02 407/61 |
| 2,855,657 A | * | 10/1958 | Erhardt | B23C 5/04 407/115 |
| 2,923,053 A | | 2/1960 | Babbitt | |
| 3,133,339 A | * | 5/1964 | Ribich | B23C 5/10 407/115 |
| 3,775,819 A | * | 12/1973 | Ribich | B23C 5/10 407/53 |
| 3,798,723 A | * | 3/1974 | Czopor | B23C 5/10 407/53 |
| 4,083,643 A | * | 4/1978 | Parone | B23C 3/36 407/59 |

(Continued)

FOREIGN PATENT DOCUMENTS

| | | |
|---|---|---|
| CH | 534561 | 4/1973 |
| CN | 201192736 Y | 2/2009 |

(Continued)

OTHER PUBLICATIONS

Jun. 23, 2016—First Office Action.
Jul. 27, 2018 Foreign OA.

*Primary Examiner* — Sara Addisu
(74) *Attorney, Agent, or Firm* — Matthew S. Bedsole (57) ABSTRACT

A rotary cutting tool has a cutting tool body with a cutting end and a cutting portion adjacent to the cutting end. The cutting portion includes a first blade, which has a first finishing cutting portion and a first roughing cutting portion adjacent to the first finishing cutting portion. The cutting portion includes a second blade, which has a second finishing cutting portion and a second roughing cutting portion adjacent to the second finishing cutting portion. The first finishing cutting portion overlaps one or both of the second finishing cutting portion and the second roughing cutting portion. The first roughing cutting portion overlaps one or both of the second roughing cutting portion and the second finishing portion.

19 Claims, 5 Drawing Sheets

(56) References Cited

U.S. PATENT DOCUMENTS

| | | | | |
|---|---|---|---|---|
| 4,174,915 A * | 11/1979 | Peetz | B23C 5/10 407/59 |
| 4,212,568 A * | 7/1980 | Minicozzi | B23C 5/10 407/53 |
| 4,285,618 A * | 8/1981 | Shanley, Jr. | B23C 5/10 407/54 |
| 4,497,600 A * | 2/1985 | Kishimoto | B23C 5/10 407/53 |
| 4,560,308 A * | 12/1985 | Deller | B23C 5/10 407/53 |
| 4,721,421 A * | 1/1988 | Klinger | B23C 5/10 407/116 |
| 4,770,567 A * | 9/1988 | Moriarty | B23C 3/36 407/59 |
| 4,810,136 A * | 3/1989 | Paige | B23C 5/10 407/54 |
| 5,562,370 A * | 10/1996 | Vogel | B23C 5/1045 407/42 |
| 5,908,269 A * | 6/1999 | Cox | B23C 3/28 407/59 |
| 6,164,876 A * | 12/2000 | Cordovano | B23C 5/10 407/59 |
| 7,204,663 B2 * | 4/2007 | Dov | B23B 51/08 407/53 |
| 7,399,147 B1 * | 7/2008 | VanDyke, Jr. | B23C 5/003 407/53 |
| 7,544,021 B2 * | 6/2009 | Flynn | B23C 5/003 407/54 |
| 7,563,059 B2 | 6/2009 | Song | |
| 8,221,036 B2 * | 7/2012 | Volokh | B23C 5/003 407/54 |
| 8,226,334 B2 * | 7/2012 | Hanks | B23C 5/10 407/59 |
| 8,366,354 B2 | 2/2013 | Davis | |
| 2004/0120777 A1 * | 6/2004 | Noland | B23C 5/10 407/63 |
| 2004/0258489 A1 * | 12/2004 | Volokh | B23C 5/10 407/53 |
| 2007/0122241 A1 * | 5/2007 | Sichi | B23C 5/10 407/54 |
| 2007/0248422 A1 * | 10/2007 | Song | B23C 5/10 407/54 |
| 2008/0193232 A1 * | 8/2008 | van Iperen | B23C 5/10 407/54 |
| 2008/0206003 A1 * | 8/2008 | Flynn | B23C 5/003 407/54 |
| 2010/0226726 A1 * | 9/2010 | Strasmann | B23C 5/003 407/54 |
| 2012/0195701 A1 * | 8/2012 | Pan | B23C 5/10 407/54 |
| 2014/0119844 A1 * | 5/2014 | Osawa | B23C 5/10 407/54 |
| 2014/0161546 A1 * | 6/2014 | Shpigelman | B23C 5/10 407/54 |
| 2015/0063928 A1 * | 3/2015 | Maeda | B23C 5/10 407/42 |
| 2015/0078841 A1 * | 3/2015 | Haimer | B23C 5/003 407/54 |
| 2015/0251253 A1 * | 9/2015 | Hufschmied | B23B 51/08 407/29.13 |

FOREIGN PATENT DOCUMENTS

| | | | |
|---|---|---|---|
| CN | 201752781 U | 3/2011 | |
| DE | 202006013594 U1 | 3/2007 | |
| DE | 202006016531 U1 | 7/2007 | |
| DE | 202007015242 U1 | 2/2008 | |
| EP | 2125275 B1 | 9/2013 | |
| FR | 2563134 A1 * | 10/1985 | ............ B23C 5/003 |
| JP | 57054019 A * | 3/1982 | ............ B23C 5/10 |
| JP | 08112709 A * | 5/1996 | ............ B23C 5/10 |
| JP | 2002233910 A * | 8/2002 | ............ B23C 5/10 |
| JP | 2016190300 A * | 11/2016 | ............ B23C 5/10 |
| WO | WO2007053171 A1 | 5/2007 | |

* cited by examiner

ROTARY CUTTING TOOL

BACKGROUND

The present invention pertains to a rotary cutting tool for removing material from a workpiece. More specifically, the present invention pertains to a rotary cutting tool such as, for example, an end mill, for removing material from a workpiece wherein a single rotary cutting tool carries out a roughing operation and a finishing operation. Even more specifically, the present invention pertains to a rotary cutting tool such as, for example, an end mill, for removing material from a workpiece wherein a single rotary cutting tool, which has a plurality blades wherein each blade has a finishing cutting edge portion and a roughing cutting edge portion so that the single rotary cutting tool carries out the roughing operation and the finishing operation.

Rotary cutting tools such as, for example, an end mill, are used for cutting many types of materials, from metals to plastics. Rotary cutting tools are supported by a shank which is generally cylindrical and adapted to be removably gripped by a motor driven chuck or functionally similar device. The shank graduates into a cutting portion on a single-end end mill or into two cutting portions on a double-end end mill. The cutting portion extends to an end of the end mill. The cutting portion has a plurality of cutting blades which are separated by flutes for carrying away the chips of the workpiece material which are generated by the cutting operation. The cutting blades and the flutes may be parallel to the end mill's longitudinal axis, but more often are helical. The cutting portion typically terminates with radial cutting features designed to complement the cutting action provided by the axial portions of the cutting blades. Generally, rotary cutting tools, (e.g., end mills) are used in milling applications such as, for example and without limitation, profile milling, tracer milling, face milling, and plunging. Rotary cutting tools can be used to remove material from workpiece materials such as, for example, stainless steels, high-temperature steels and aluminum alloys.

Heretofore, many end mills do not have the capability to rough and finish using the same end mill. Therefore, it would be highly desirable to provide a rotary cutting tool (e.g., end mill) that can rough and finish using the same end mill tool. Even though some end mills operate so as to perform a roughing and finishing operation, such end mills exhibit a straight cutting edge or a chip breaker form (for roughing) which is continuous on any one blade. These end mills do not use a true roughing form and a straight finishing form on a single cutting edge. Further, these end mills do not use a roughing cutting portion and a finishing portion that are overlapping and staggered with reference to the adjacent blade. Therefore, it would be highly desirable to provide a rotary cutting tool that has a roughing cutting portion and finishing cutting portion on the same blade. It would also be highly desirable to provide a rotary cutting tool that has a plurality of blades wherein each blade a roughing cutting portion and finishing cutting portion and wherein the roughing cutting portion and finishing cutting portion of adjacent blades overlap. Such a rotary cutting tool reduces the torque (and the horsepower consumption) necessary to properly function due to the overlapping dual profile cutting edges.

While end mills in the past exhibit both axial and radial engagement with the workpiece, there remains a need to improve such engagement. Therefore, it would be highly desirable to provide a rotary cutting tool that can increase both axial and radial engagement due to the rougher profile of the cutting edge and exhibit more aggressive overall cutting characteristics.

Earlier end mills have operated in a satisfactory manner; however, there remains a need to improve the operation of such end mills. Therefore, it would be highly desirable to provide a rotary cutting tool that can reduce the tool deflection during operation which then allows for greater feeding rates.

It would also be highly desirable to provide a rotary cutting tool that can better break chips that results in the better evacuation of the chips then has heretofore been available. It would be highly desirable to provide a rotary cutting tool that reduces the harmonics which occur in long wall applications. It would be highly desirable to provide a rotary cutting tool that cuts with heavier feeds using less horsepower and leaves a finished surface on the workpiece.

SUMMARY

In one form thereof, the invention is a rotary cutting tool comprising a cutting tool body comprising a cutting end and a cutting portion adjacent to the cutting end. The cutting portion comprises a first blade that has a first finishing cutting portion and a first roughing cutting portion adjacent to the first finishing cutting portion. The cutting portion comprises a second blade that has a second finishing cutting portion and a second roughing cutting portion adjacent to the second finishing cutting portion. The first finishing cutting portion overlaps one or both of the second finishing cutting portion and the second roughing cutting portion. The first roughing cutting portion overlaps one or both of the second roughing cutting portion and the second finishing portion, In another form thereof, the invention is a rotary cutting tool comprising a cutting tool body comprising a cutting end and a cutting portion adjacent to the cutting end. The cutting portion comprises a first blade that has a first finishing cutting portion and a first moderate roughing cutting portion adjacent to the first finishing cutting portion. A second blade has a second finishing cutting portion and a second moderate roughing cutting portion adjacent to the second finishing cutting portion. The first finishing cutting portion overlaps one or more of the second finishing cutting portion and the second moderate roughing cutting portion. The first moderate roughing cutting portion overlaps one or more of the second moderate roughing cutting portion and the second finishing cutting portion. The first finishing cutting portion comprises a first finishing straight eccentric ground cutting edge, and the first moderate roughing cutting edge comprises a first moderate roughing sinusoidal cutting edge. The second finishing cutting portion comprises a second finishing straight eccentric ground cutting edge, and the second moderate roughing cutting portion comprises a second moderate roughing sinusoidal cutting edge.

In yet another form thereof, the invention is a rotary cutting tool comprising a cutting tool body that has a cutting end and a cutting portion adjacent to the cutting end. The cutting portion comprises a first blade that has a first moderate roughing cutting portion and a first roughing cutting portion adjacent to the first moderate roughing cutting portion. A second blade comprises a second moderate roughing cutting portion and a second roughing cutting portion adjacent to the second moderate roughing cutting portion. The first moderate roughing cutting portion overlaps one or more of the second moderate roughing cutting portion and the second roughing cutting portion. The first roughing cutting portion overlaps one or more of the second roughing cutting portion and the second moderate roughing cutting portion. The first moderate roughing cutting portion comprises a first moderate roughing sinusoidal cutting edge, and the first roughing cutting portion comprises a first roughing sinusoidal cutting edge. The second moderate roughing cutting portion is a second moderate roughing sinusoidal cutting edge, and the second roughing cutting portion is a second roughing sinusoidal cutting edge.

BRIEF DESCRIPTION OF THE DRAWINGS

The following is a brief description of the drawings that form a part of this patent application.

DETAILED DESCRIPTION

Figure 1:
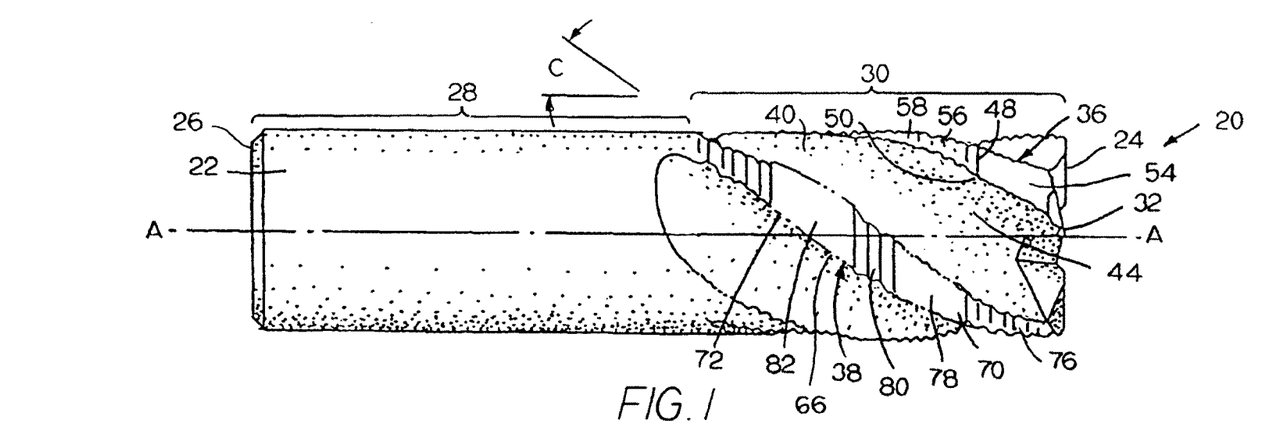
FIG. 1 is a side view of the first specific embodiment of an end mill, which is a rotary cutting tool.
Figure 2:
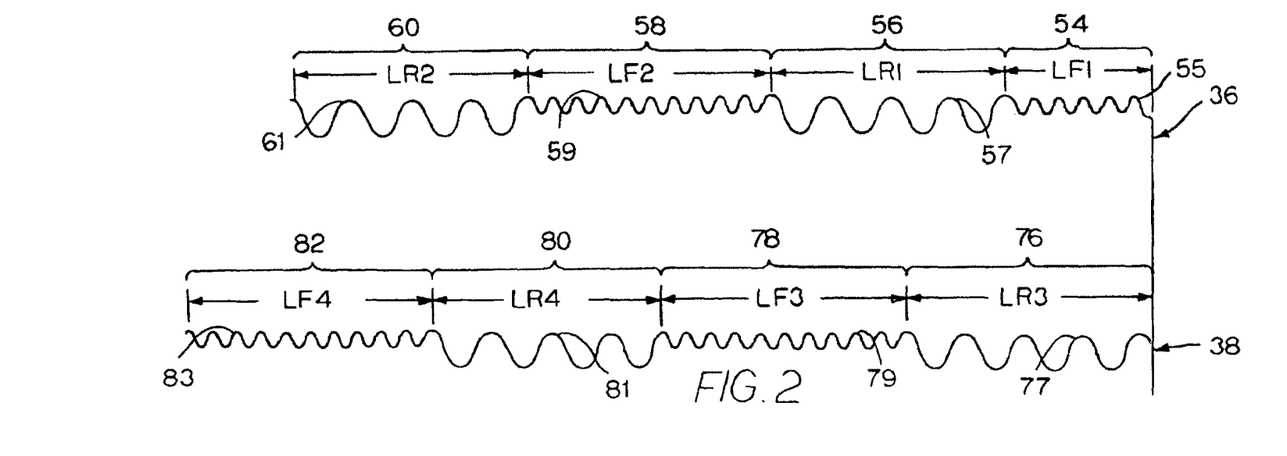
FIG. 2 is a schematic view of the end mill of FIG. 1 showing the profile of the cutting edges for selected lengths along two adjacent blades.

Referring to the drawings, FIGS. 1 and 2 illustrate a first specific embodiment of a rotary cutting tool, which is an end mill, and is generally designated as 20. Rotary cutting tool 20 has an elongate cutting tool body 22 that has a central longitudinal axis A-A. Cutting tool body 22 has an axial forward end 24 and an axial rearward end 26 wherein there is a shank portion (see bracket 28) adjacent the axial rearward end 26 and a cutting portion (see bracket 30) adjacent to the axial forward end 24. A cutting end 32 is at the axial forward end 24 of the cutting tool body 22 so that the cutting end 32 is the axially forwardmost part of the cutting portion 30.

Elongate cutting tool body 22 has a plurality of blades wherein there is a first blade generally designated as 36 and a second blade generally designated as 38. The first blade 36 and the second blade 38 are separated by a flute 40. In this specific embodiment, the rotary cutting tool 20 has four blades and four flutes. However, there is the contemplation that the rotary cutting tool may have a different number of blades and flutes including, without limitation, an odd number of flutes and an even number of flutes. There is no intention to restrict the scope of the invention by this specific embodiment. Further, the blades (36, 38) and flutes (40) exhibit a helical geometry, and are disposed at an angle C with respect to the central longitudinal axis A-A of the elongate cutting tool body 22. While angle C can vary, angle C typically ranges between about 35 degrees and about 45 degrees.

First blade 36 has a leading face 44 and a trailing face wherein a land surface 48 is between the leading face 44 and the trailing face. There is a cutting edge 50 as the intersection of the leading face 44 and the land surface 48. The cutting edge 50 has a series of sets of finishing cutting portions and roughing cutting portions. There is the contemplation that the number, length and sequence of the finishing cutting portions and roughing cutting portions can vary depending upon the specific cutting application.

The cutting edge 50 has a first moderate roughing cutting portion 54 at the axial forwardmost location, and the first moderate roughing cutting portion 54 extends in an axial rearward direction along the cutting edge 50 for a first moderate roughing length LF1. The first moderate roughing cutting portion 54 comprises a plurality of sinusoidal-shaped moderate roughing edges or finishing teeth 55. The amplitude and frequency of the moderate roughing teeth can vary depending upon the specific cutting application. The moderate roughing teeth have such a geometry that the surface finish of the workpiece is sufficiently smooth so as to comprise a finished surface in some applications.

Cutting edge 50 of the first blade 36 further has a first roughing cutting portion 56 that is adjacent to and axially rearward of the first moderate roughing cutting portion 54 and which extends in an axial rearward direction along the cutting edge 50 for a first roughing length LR1. The first roughing cutting portion 56 comprises a plurality of sinusoidal-shaped roughing edges or roughing teeth 57. The amplitude of the sinusoidal-shaped roughing teeth 57 is greater than the amplitude of the sinusoidal-shaped finishing teeth 55. The amplitude and frequency of the roughing teeth can vary depending upon the specific cutting application. The roughing teeth have such a geometry that the surface finish of the workpiece is rougher than what is considered to be a finished surface. The sinusoidal-shaped roughing teeth 57 engage the workpiece material so as to result in a more aggressive cut that results in the workpiece having a rougher surface than the workpiece surface resulting from the sinusoidal-shaped moderate roughing teeth 55. The result of the engagement of the workpiece by the sinusoidal-shaped moderate roughing teeth 55 is a workpiece with a smoother surface finish than resulting from the engagement of the workpiece with the sinusoidal-shaped roughing teeth 57.

Figure 2A:
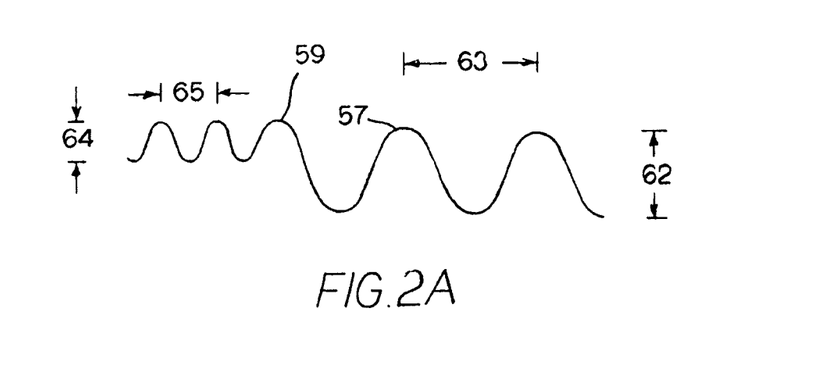
FIG. 2A is an enlarged view of a section of the schematic view of FIG. 2.

FIG. 2A illustrates the joinder of the first roughing cutting portion 56 and the second moderate roughing cutting portion 58. In the context of the sinusoidal teeth (e.g., roughing teeth 57 and moderate roughing teeth 59), the amplitude 62 of the roughing teeth 57 is measured as the total height of a roughing tooth. The frequency 63 of the roughing teeth 57 is the distance between the peaks of adjacent roughing teeth 57. The amplitude 64 of the moderate roughing teeth 59 is measured as the total height of a moderate roughing tooth. The frequency 65 of the moderate roughing teeth 59 is the distance between the peaks of adjacent moderate roughing teeth 59.

Cutting edge 50 of the first blade 36 has a second moderate roughing cutting portion 58 axially rearward of and adjacent to the first roughing cutting portion 56. Second moderate roughing cutting portion 58 extends in an axial rearward direction along the cutting edge 50 for a second moderate roughing length LF2. Like for the first moderate roughing cutting portion 54, the moderate roughing teeth 59 of the second moderate roughing cutting portion 58 have an amplitude and frequency that can vary depending upon the specific cutting application. The moderate roughing teeth 59 have such a geometry that the surface finish of the workpiece is sufficiently smooth so as to comprise a finished surface in some applications.

Cutting edge 50 has a second roughing cutting portion 60 that is axially rearward of and adjacent to the second moderate roughing cutting portion 58 and which extends in an axial rearward direction along the cutting edge 50 for a second roughing length LR2. Like for the first roughing cutting portion 56, the second roughing cutting portion 60 comprises a plurality of sinusoidal-shaped roughing edges or roughing teeth 61. The amplitude and frequency of the roughing teeth 61 can vary depending upon the specific cutting application. In this first specific embodiment, the length of the first moderate roughing cutting portion 54 is less than the length of the second moderate roughing cutting portion 58, and the length of the first roughing cutting portion 56 is the same as the length of the second roughing cutting portion 60. There should be an appreciation that for each blade, the number of and lengths of the various finishing cutting portions and roughing cutting portions can vary depending upon the specific application for the rotary cutting tool 20.

Second blade 38 has a leading face 66 and a trailing face wherein a land surface 70 is between the leading face 66 and a trailing face 68. There is a cutting edge 72 at the intersection of the leading face 66 and the land surface 70. The cutting edge 72 has a series of sets of moderate roughing cutting portions and roughing cutting portions. There is the contemplation that the number, length and sequence of the moderate roughing cutting portions and roughing cutting portions can vary depending upon the specific cutting application.

The cutting edge 72 has a third roughing cutting portion 76 at the axial forwardmost location and extends in an axial rearward direction along cutting edge 72 for a third roughing length LR3. The third roughing cutting portion 76 has a plurality of sinusoidal third roughing edges or teeth 77. The amplitude and frequency of the roughing teeth can vary depending upon the specific cutting application. The cutting edge 72 has a third moderate roughing cutting portion 78 that is axially rearward of and adjacent to the third roughing cutting portion 76. The third moderate roughing cutting portion 78 extends in an axial rearward direction along cutting edge 72 for a third moderate roughing length LF3. The third moderate roughing cutting portion 78 has a plurality of sinusoidal-shaped moderate roughing edges or moderate roughing teeth 79. The amplitude and frequency of the moderate roughing teeth can vary depending upon the specific cutting application. The moderate roughing teeth have such a geometry that the surface finish of the workpiece is sufficiently smooth so as to comprise a finished surface in some applications.

Cutting edge 72 further has a fourth roughing cutting portion 80 that is axially rearward of and adjacent to the third moderate roughing cutting portion 78 and which extends in an axial rearward direction along cutting edge 72 for a fourth roughing length LR4. The amplitude and frequency of the fourth roughing teeth 81 can vary depending upon the specific cutting application. Cutting edge 72 has a fourth moderate roughing cutting portion 82 that is axially rearward of and adjacent to the fourth roughing cutting portion 80 and which extends in an axial rearward direction along cutting edge 72 for a fourth moderate roughing length LF4. The fourth moderate roughing cutting portion 82 has a plurality of sinusoidal-shaped moderate roughing edges or moderate roughing teeth 83. The amplitude of the sinusoidal-shaped roughing teeth is greater than the amplitude of the sinusoidal-shaped moderate roughing teeth whereby the sinusoidal-shaped roughing teeth engage the workpiece material so as to result in a more aggressive cut with a rougher surface than do the sinusoidal-shaped moderate roughing teeth. The result of the engagement of the workpiece by the sinusoidal-shaped moderate roughing teeth is a workpiece with a smoother surface finish than resulting from the engagement of the workpiece with the sinusoidal-shaped roughing teeth.

Referring to FIG. 2, it is apparent that there is an overlap between the various moderate roughing cutting edges and roughing cutting edges. More specifically, the first finishing cutting portion 54 is of a lesser length than the third roughing cutting portion 76 so that there is an overlap there between. The first roughing cutting portion 56 overlaps the third roughing cutting portion 76 and the third moderate roughing cutting portion 78. The second moderate roughing cutting portion 58 overlaps the third moderate roughing cutting portion 78 and the fourth roughing cutting portion 80. The second roughing cutting portion 60 overlaps the fourth roughing cutting portion 80 and the fourth moderate roughing cutting portion 82. As a result of this overlap, the rotary cutting tool 20 engages the workpiece so as to both rough and moderately rough or finish in one operation.

There should be an appreciation that FIG. 2 illustrates only two of the blades (36, 38) of rotary cutting tool 20 that includes four blades. Therefore, the extent of overlap between the cutting portions of the various blades is more extensive than shown for only two of the blades. The orientation of the overlap of the cutting portions on the plurality of blades can be such that the moderate roughing cutting portion, which for this embodiment would produce the most finished surface on the workpiece, extends along the entire length of the cutting portion.

There should be an appreciation that along each cutting edge of each blade, there are one or more interruptions to the profile of the cutting edge of the blade. For example, referring to FIG. 2, cutting edge 50 of first blade 36 has an interruption in the profile at the joinder of the first moderate roughing cutting portion 54 and the first roughing cutting portion 56. There is an interruption in the profile at the joinder of the first roughing cutting portion 56 and the second moderate roughing cutting portion. There is an interruption in the profile at the joinder of the second moderate roughing cutting portion 58 and the second roughing cutting portion 60. Referencing the interruptions, there is a reduction in the cutting forces and the tool pressure thereby decreasing torque as well harmonics since there is an interruption in the cutting edge with the option of the multiple amplitude frequency of the sinusoidal edge or coupled with the sinusoidal edge interrupting the straight eccentric finishing edge (as shown in rotary cutting tools 100, 200, and 270) that allows for higher feed and less horsepower consumption or spindle load. Similar kinds of benefits and advantages are provided by the interruptions in the profile of the cutting edge 72 of the second blade 38. These interruptions are at the joinder of the third roughing cutting portion 76 to the third moderate roughing cutting portion 78, the joinder of the third moderate roughing cutting portion 78 to the fourth roughing cutting portion 80, and the joinder of the fourth roughing cutting portion 80 to the fourth moderate roughing cutting portion 82.

Figure 3:
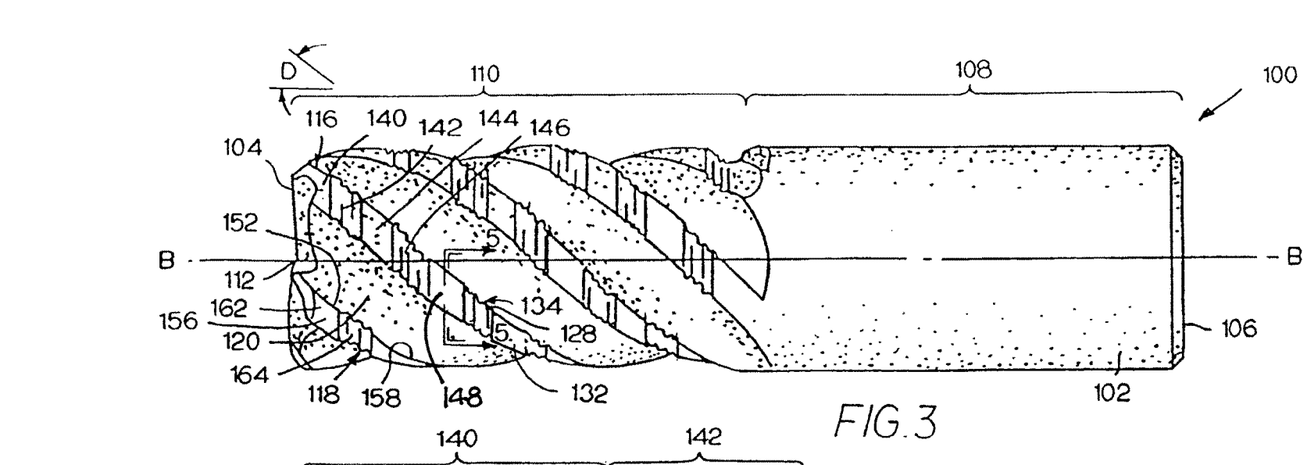
FIG. 3 is a side view of a second specific embodiment of the end mill.
Figure 4:
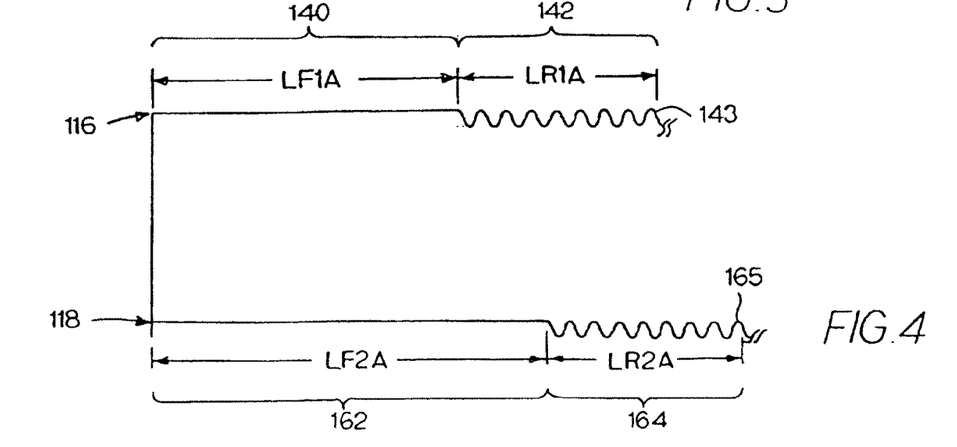
FIG. 4 is a schematic view of the end mill of FIG. 3 showing the profile of the cutting edges for selected length along two adjacent blades.

Referring to FIGS. 3-4, there is illustrated a second specific embodiment of a rotary cutting tool, which is an end mill, and is generally designated as 100. Rotary cutting tool 100 has an elongate cutting tool body 102, which has a central longitudinal axis B-B, with an axial forward end 104 and an axial rearward end 106. There is a cutting end 112 adjacent to the axial forward end 104 of the cutting tool body 102. The cutting tool body 102 has a shank portion (see bracket 108) adjacent the axial rearward end 106 and a cutting portion (see bracket 110) adjacent the axial forward end 104. The cutting portion 100 is adjacent to the cutting end 112.

The cutting tool body 102 has a plurality of blades including a first blade generally designated as 116 and a second blade generally designated as 118. A flute 120 separates the first blade 116 and the second blade 118. Rotary cutting tool 100 has five blades and five flutes. However, there is the contemplation that the rotary cutting tool may have a different number of blades and flutes and there is no intention to restrict the scope of the invention by this specific embodiment. Further, the blades and flutes exhibit a helical geometry and are disposed at an angle D with respect to the central longitudinal axis B-B of the elongate cutting tool body 102. While angle D can vary, angle D typically ranges between about 35 degrees and about 45 degrees.

Figure 5:
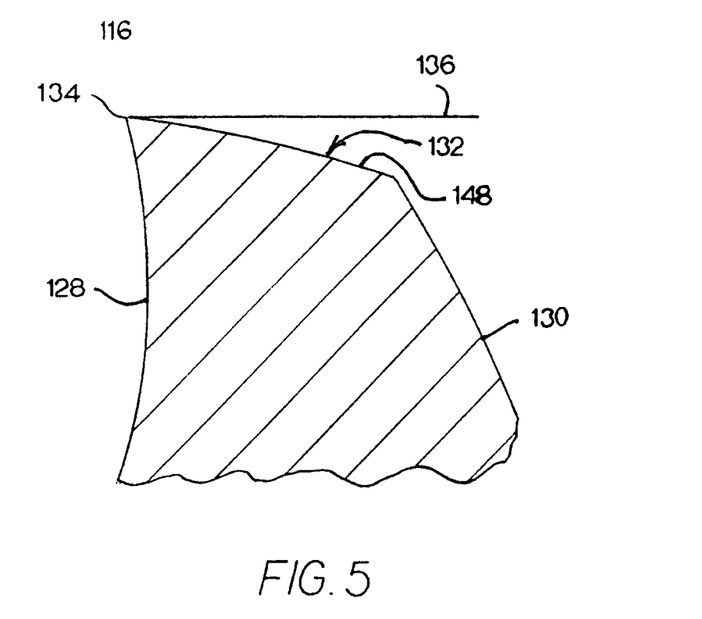
FIG. 5 is a cross-sectional view of a blade taken along section line 5-5 of FIG. 3 showing the eccentric ground finishing edge.

The first blade 116 has a leading face 128 and a trailing face with a land surface 132 between the leading face 128 and the trailing face 130. There is a cutting edge 134 at the intersection of the leading face 128 and the land surface 132. The cutting edge 134 of blade 116 has a first finishing cutting portion 140 that extends in an axial rearward direction along cutting edge 134 for a first finishing length LF1A. The first finishing cutting portion 140 has a smooth edge that has an eccentric radial relief. More specifically, FIG. 5 is a cross-sectional view through the first blade 116 showing the land surface 132 which extends arcuately (convex-shaped) within a plane 136 perpendicular to the longitudinal axis B-B of the rotary cutting tool 100, which is an eccentric radial relief. The land surface 132 blends into the trailing face 130. U.S. Pat. No. 8,366,354 to Davis for a Rotary Cutting Tool with Chip Breaker Pattern, which is incorporated herein in its entirely by reference, describes a eccentric radial relief on the blade of a rotary cutting tool.

Cutting edge 134 of the first blade 116 further has a first roughing cutting portion 142 that is axially rearward of and adjacent to the first finishing cutting portion 140. The first roughing cutting portion 142 extends in an axial rearward direction along cutting edge 134 for a first roughing length LR1A. The first roughing cutting portion 142 has a plurality of sinusoidal-shaped roughing edges or roughing teeth 143. The amplitude and frequency of the roughing teeth can vary depending upon the specific cutting application. There is a second finishing cutting portion 144 axially rearward of the first roughing cutting portion 142, a second roughing cutting portion 146 axially rearward of the second finishing cutting portion 144, and a third finishing cutting portion 148 axially rearward of the second roughing cutting portion 146.

Second blade 118 has a leading face 152 and a trailing face wherein a land surface 156 is between the leading face 152 and a trailing face 154. There is a cutting edge 158 at the intersection of the leading face 152 and the land surface 156. The cutting edge 158 of the second blade 118 has a second finishing cutting portion 162 that extends in an axial rearward direction along cutting edge 158 for a second finishing length LF2A. The second finishing cutting portion 162 has an eccentric radial relief. The cutting edge 158 has a second roughing cutting portion 164 that is axially rearward of and adjacent to the second finishing cutting portion 162 and which extends in an axial rearward direction along cutting edge 158 for a second roughing length LR2A. The second roughing cutting portion 164 has a plurality of sinusoidal-shaped roughing edges or roughing teeth 165. The amplitude and frequency of the roughing teeth can vary depending upon the specific cutting application.

Referring to FIG. 4, it is apparent that there is an overlap between the various finishing cutting edge and roughing cutting edges. More specifically, the first finishing cutting portion 140 is of a lesser length than the second finishing cutting portion 162. The second finishing cutting portion 162 overlaps the first finishing cutting portion 140 and the first roughing cutting portion 142. The second roughing cutting portion 164 overlaps the first roughing cutting portion 142 and the portion (not illustrated) adjacent to the first roughing cutting portion 142. As a result of this overlap, the rotary cutting tool 100 engages the workpiece so as to both rough and finish in one operation. There should be an appreciation that FIG. 4 illustrates only two of the blades (116, 118) of rotary cutting tool 100 that includes a plurality of blades. Therefore, the extent of overlap between the cutting portions of the various blades is more extensive than shown for only two of the blades. The orientation of the overlap of the cutting portions on the plurality of blades can be such that the finishing cutting portions, which for this embodiment would produce the most finished surface on the workpiece, extends along the entire length of the cutting portion.

There should be an appreciation that along each cutting edge of each blade, there are one or more interruptions to the profile of the cutting edge of the blade. For example, FIG. 4 illustrates the profile of cutting edge 134 of first blade 116 and the profile of the cutting edge 158 of second blade 118. Referring to the first blade 116, there is an interruption in the profile at the joinder of the first finishing cutting portion 140 and the first roughing cutting portion 142. There is an interruption in the profile of the second blade 118 at the joinder of the second finishing cutting portion 162 and the second roughing cutting portion 164. Referencing the interruptions, there is a reduction in the cutting forces and the tool pressure thereby decreasing torque as well harmonics since there is an interruption in the cutting edge with the option of the multiple amplitude frequency of the sinusoidal edge or coupled with the sinusoidal edge interrupting the straight eccentric finishing edge that allows for higher feed and less horsepower consumption or spindle load.

Figure 6:
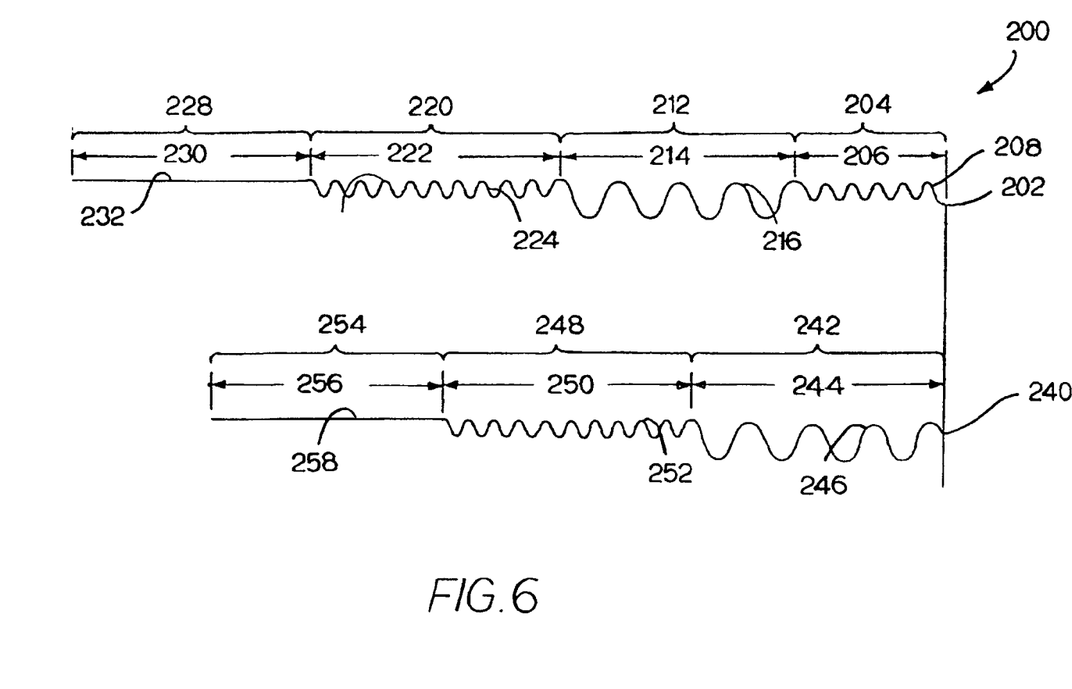
FIG. 6 is a schematic view of a third specific embodiment of an end mill (i.e., a rotary cutting tool) showing the profile of the cutting edges for selected lengths along two adjacent blades.

Referring to FIG. 6, there is shown the profiles of the cutting edges for selected lengths along two adjacent blades of a third specific embodiment of the rotary cutting tool generally designated at 200. The first blade 202 has a first moderate roughing cutting portion 204 at the axial forward end thereof. The first moderate roughing cutting portion 204 extends in an axial rearward direction for a first moderate roughing length 206. The first moderate cutting portion 204 has a plurality of moderate roughing cutting teeth 208. Axially rearward of the first moderate roughing cutting portion 204 is a first roughing cutting portion 212, which extends in an axial rearward direction a first roughing length 214 and comprises roughing cutting teeth 216. A second moderate roughing cutting portion 220, which comprises a plurality of moderate roughing cutting teeth 224, is axial rearward of the first roughing cutting portion 212 and extends a second moderate roughing length 222 in the axial rearward direction. A first finishing cutting portion 228, which has a first finishing cutting edge 232 and which has an eccentric radial relief, is axially rearward of the second moderate roughing cutting portion 220 and extends for a first finishing length in the axial rearward direction.

The third specific embodiment has a second blade 240 which has at the axial forward end a roughing cutting portion 242, which comprises a plurality of roughing cutting teeth 246. The roughing cutting portion 242 extends for a roughing length 244 in the axial rearward direction from the axial forward end. A moderate roughing cutting portion 248, which has a plurality of moderate roughing teeth 252, is axially rearward of the roughing cutting portion 242 and extends for a moderate roughing length 250 in the axial rearward direction. A finishing cutting portion 254, which has a finishing cutting edge 258 and which has an eccentric radial relief, is axially rearward of the moderate roughing cutting portion 248 and extends for a finishing length 256 in the axial rearward direction.

Referring to FIG. 6, it is apparent that there is an overlap between the various cutting portions that comprises the first blade 202 and second blade 240. More specifically, the roughing cutting portion 242 of the second blade 240 overlaps the first moderate roughing cutting portion 204 and the first roughing cutting portion 212 of the first blade 202. The moderate roughing cutting portion 248 of the second blade 240 overlaps the first roughing cutting portion 212 and the second moderate roughing cutting portion 220 of the first blade 202. The finishing cutting portion 254 of the second blade overlaps the second moderate roughing cutting portion 220 and the first finishing cutting portion 228 of the first blade 202. As a result of the overlapping, the rotary cutting tool 200 provides for the roughing and finishing of the workpiece. There should be an appreciation that FIG. 6 illustrates only two of the blades of rotary cutting tool that includes a plurality of blades. Therefore, the extent of overlap between the cutting portions of the various blades is more extensive than shown for only two of the blades. The orientation of the overlap of the cutting portions on the plurality of blades can be such that the finishing cutting portions, which for this embodiment would produce the most finished surface on the workpiece, extends along the entire length of the cutting portion.

Figure 7:
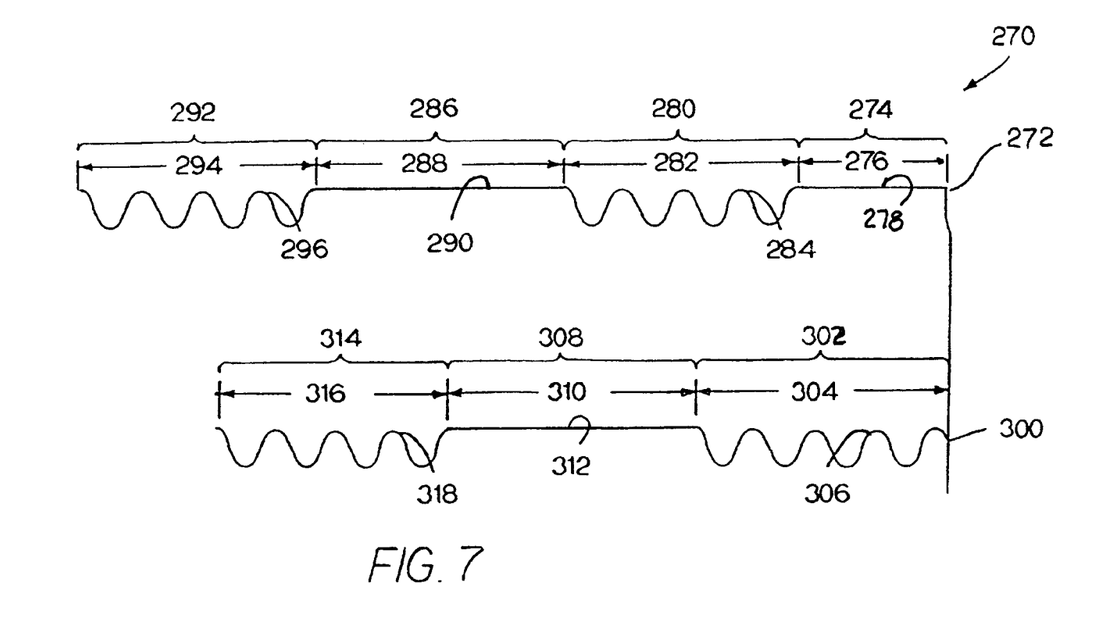
FIG. 7 is a schematic view of a fourth specific embodiment of an end mill (i.e., a rotary cutting tool) showing the profile of the cutting edges for selected lengths along two adjacent blades.

Referring to FIG. 7, there is shown the profiles of the cutting edges for selected lengths along two adjacent blades of a fourth specific embodiment of the rotary cutting tool generally designated at 270. The first blade 272 comprises a first finishing cutting portion 274, which has a finishing cutting edge 278 and an eccentric radial relief. The first finishing cutting portion 274 extends for a first finishing length 276 in the axial rearward direction from the axial forward end of the first blade 272. A first roughing cutting portion 280, which has a plurality of first roughing cutting teeth 284, is axially rearward of the first finishing cutting portion 274 and extends for a first roughing length 282 in the axial rearward direction. A second finishing cutting portion 286 is axially rearward of the first roughing cutting portion 280 and extends for a second finishing length 288 in the axial rearward direction from the first roughing cutting portion 280. The second finishing cutting portion 286 has a finishing cutting edge 290 and has an eccentric radial relief. A second roughing cutting portion 292, which has a plurality of second roughing cutting teeth 296, is axial rearward of the second finishing cutting portion 286 and extends for a second roughing cutting length 296 in the axial rearward direction from the second finishing cutting portion 286.

The second blade 300 comprises a first roughing cutting portion 302 at the axial forward end of the second blade 300. The first roughing cutting portion 302, which has a plurality of first roughing teeth 306, extends for a first roughing length 304 in the axial rearward direction. A finishing cutting portion 308, which has a finishing cutting edge 312 and which has an eccentric radial relief, is axially rearward of the first roughing cutting portion 302 and extends for a finishing length 310 in the axial rearward direction. A second roughing cutting portion 314, which has a plurality of second roughing cutting teeth 318, is axially rearward of the finishing cutting portion 308 and extends for a second roughing length 316 in the axial rearward direction. Although not described in detail for this specific embodiment, the interruptions of the profile of the cutting edge of each blade provide for the benefits and advantages described above in connection with the rotary cutting tool 20 and rotary cutting tool 100.

Referring to FIG. 7, it is apparent that there is an overlap between the various cutting portions of the first and the second blades. More specifically, the second blade 300 has a first roughing cutting portion 302 that overlaps the first finishing cutting portion 274 and the first roughing cutting portion 280 of the first blade 272. The finishing cutting portion 308 of the second blade 300 overlaps the first roughing cutting portion 280 and the second finishing cutting portion 286 of the first blade 272. The second roughing cutting portion 314 overlaps the second finishing cutting portion 286 and the second roughing cutting portion 292 of the first blade 272. As a result of the overlapping, the rotary cutting tool 270 can both rough and finish the workpiece. There should be an appreciation that FIG. 7 illustrates only two of the blades of rotary cutting tool that includes a plurality of blades. Therefore, the extent of overlap between the cutting portions of the various blades is more extensive than shown for only two of the blades. The orientation of the overlap of the cutting portions on the plurality of blades can be such that the finishing cutting portions, which for this embodiment would produce the most finished surface on the workpiece, extends along the entire length of the cutting portion. Although not described in detail for this specific embodiment, the interruptions of the profile of the cutting edge of each blade provide for the benefits and advantages described above in connection with the rotary cutting tool 20 and rotary cutting tool 100.

There should be an appreciation that variations in amplitude and frequency of the sinusoidal cutting edge as well as the extent and nature of the overlap of both edge forms (e.g., sinusoidal edge and straight edge) can occur in order to accommodate a specific application. Further, there should be an appreciation that both the roughing edge and finishing edge, as well as the moderate roughing edge, should cut within the same plane with the overlap to the leading or trailing flute or flutes. While the specific parameters can vary based how many flutes, how long the cutter, how large the diameter, and many other variables, the various edges should cut within the same plane in order to optimize the effectiveness of the finishing edge.

There should also be an appreciation that the dimensional relationships between the different cutting portions (i.e., finishing cutting portion, moderate roughing cutting portion, and roughing cutting portion) can vary. The dimensional relationships could be limited by manufacturing capabilities. The dimensional relationships can also be impacted by the specific workpiece material, as well as goals of reducing a rougher finish to less of a rough finish in the case of using a moderate magnitude and amplitude cutting portion overlapping a more aggressive cutting portion. Additional goals include without limitation the reduction of tool pressure, harmonics, torque and other performance properties wherein these goals can be achieved by balancing the properties of the different cutting portions. It can be to the extreme to reduce all as much as possible by using more aggressive rougher edges on the various flutes.

It is apparent that the present rotary cutting tool provides advantages over earlier rotary cutting tools. More specifically, the present invention provides a rotary cutting tool (e.g., an end mill) many that can rough and finish using the same end mill tool. Further, the present invention provides a rotary cutting tool that uses a true roughing form and a straight finishing form on a single cutting edge. The present invention provides a rotary cutting tool that has a roughing cutting portion and finishing cutting portion on the same blade and wherein the roughing cutting portion and finishing cutting portion of adjacent blades overlap. Such a rotary cutting tool reduces the torque (and the horsepower consumption) necessary to properly function due to the overlapping dual profile cutting edges.

It is also apparent that the present invention provides a rotary cutting tool that can increase both axial and radial engagement due to the rougher profile of the cutting edge and exhibit more aggressive overall cutting characteristics. In addition, the present invention provides a rotary cutting tool that can reduce the tool deflection during operation which then allows for greater feeding rates. The present also provides a rotary cutting tool that can better break chips that results in the better evacuation of the chips then has heretofore been available and that reduces the harmonics which occur in long wall applications. Finally, it is apparent that the present invention provides a rotary cutting tool that cuts with heavier feeds using less horsepower and leaves a finished surface on the workpiece.

The patents and other documents identified herein are hereby incorporated by reference herein in their entireties to the full extent permitted by law. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A rotary cutting tool comprising:
   a cutting tool body comprising a cutting end, and the cutting tool body comprising a cutting portion adjacent to the cutting end thereof;
   the cutting portion comprising a first blade comprising a first finishing cutting portion and a first roughing cutting portion adjacent to the first finishing cutting portion, and the cutting portion comprising a second blade comprising a second finishing cutting portion and a second roughing cutting portion adjacent to the second finishing cutting portion; and
   the first finishing cutting portion overlapping the second roughing cutting portion and the first roughing cutting portion overlapping the second finishing portion.

2. The rotary cutting tool according to claim 1 wherein the first finishing cutting portion extends for a first finishing length along the first blade, and the first roughing cutting portion extends a first roughing length along the first blade, and the first finishing length is equal to the first roughing length.

3. The rotary cutting tool according to claim 1 wherein the first finishing cutting portion extends for a first finishing length along the first blade, and the first roughing cutting portion extends a first roughing length along the first blade, and the first finishing length is not equal to the first roughing length.

4. The rotary cutting tool according to claim 1 wherein the first finishing cutting portion comprises a first finishing straight cutting edge, and the first roughing cutting portion comprises a first roughing sinusoidal cutting edge, and the second finishing cutting portion comprises a second finishing straight cutting edge, and the second roughing cutting portion comprises a second roughing sinusoidal cutting edge.

5. The rotary cutting tool according to claim 1 wherein the first finishing cutting portion begins at and extends in an axial rearward direction for a first finishing length from adjacent the cutting end of the cutting tool body, and the second roughing cutting portion beginning at and extending in an axial rearward direction for a second roughing length from adjacent the cutting end of the cutting tool body.

6. The rotary cutting tool according to claim 5 wherein the first finishing length is less than the second roughing length.

7. The rotary cutting tool according to claim 1 wherein the first finishing cutting edge extends for a first finishing length along the first blade, and the first roughing cutting edge extends a first roughing length along the first blade.

8. The rotary cutting tool according to claim 1 wherein the cutting tool body comprising an axial forward end and an axial rearward end, and the cutting end being at the axial forward end, the cutting tool body comprising a shank portion adjacent to the axial rearward end thereof.

9. The rotary cutting tool according to claim 1 wherein the first blade defines a first cutting edge, the first finishing cutting portion joining the first roughing cutting portion, and the first cutting edge having an interruption at the joinder of the first finishing cutting portion to the first roughing cutting portion.

10. The rotary cutting tool according to claim 9 wherein the second blade defines a second cutting edge, the second finishing cutting portion joining the second roughing cutting portion, and the second cutting edge having an interruption at the joinder of the second finishing cutting portion to the second roughing cutting portion.

11. The rotary cutting tool according to claim 1, wherein the first finishing cutting portion overlaps the second finishing cutting portion.

12. The rotary cutting tool according to claim 1, wherein the first roughing cutting portion overlaps the second roughing cutting portion.

13. A rotary cutting tool comprising:
    a cutting tool body comprising a cutting end, and the cutting tool body further comprising a cutting portion adjacent to the cutting end;
    the cutting portion comprising a first blade comprising a first finishing cutting portion and a first moderate roughing cutting portion adjacent to the first finishing cutting portion, and a second blade comprising a second finishing cutting portion and a second moderate roughing cutting portion adjacent to the second finishing cutting portion;
    the first finishing cutting portion overlapping one or more of the second finishing cutting portion and the second moderate roughing cutting portion, and the first moderate roughing cutting portion overlapping one or more of the second moderate roughing cutting portion and the second finishing cutting portion; and
    wherein the first finishing cutting portion comprises a first finishing straight eccentric ground cutting edge, and the first moderate roughing cutting edge comprises a first moderate roughing sinusoidal cutting edge, and the second finishing cutting portion comprises a second finishing straight eccentric ground cutting edge, and the second moderate roughing cutting portion comprises a second moderate roughing sinusoidal cutting edge.

14. The rotary cutting tool according to claim 13 wherein the first blade further comprising a first roughing cutting portion adjacent to the first moderate roughing cutting portion, and the second blade comprising a second roughing cutting portion adjacent to the second moderate roughing portion.

15. The rotary cutting tool according to claim 13 wherein the first roughing cutting portion comprises a first roughing sinusoidal cutting edge, and the second roughing cutting portion comprising a second roughing sinusoidal roughing cutting edge.

16. The rotary cutting tool according to claim 15 wherein the first moderate roughing sinusoidal cutting edge has a first moderate roughing amplitude, the first roughing sinusoidal cutting edge has a first roughing amplitude, and the first roughing amplitude being greater than the first moderate roughing amplitude, and the second moderate roughing sinusoidal cutting edge has a second moderate roughing amplitude, the second roughing sinusoidal cutting edge has a second roughing amplitude, and the second roughing amplitude being greater than the second moderate roughing amplitude.

17. A rotary cutting tool comprising:
   a cutting tool body comprising a cutting end, and the cutting tool body further comprising a cutting portion adjacent to the cutting end;
   the cutting portion comprising a first blade comprising a first moderate roughing cutting portion and a first roughing cutting portion adjacent to the first moderate roughing cutting portion, and a second blade comprising a second moderate roughing cutting portion and a second roughing cutting portion adjacent to the second moderate roughing cutting portion;
   the first moderate roughing cutting portion overlapping one or more of the second moderate roughing cutting portion and the second roughing cutting portion, and the first roughing cutting portion overlapping one or more of the second roughing cutting portion and the second moderate roughing cutting portion; and
   wherein the first moderate roughing cutting portion comprises a first moderate roughing sinusoidal cutting edge, and the first roughing cutting portion comprises a first roughing sinusoidal cutting edge, and the second moderate roughing cutting portion is a second moderate roughing sinusoidal cutting edge, and the second roughing cutting portion is a second roughing sinusoidal cutting edge.

18. The rotary cutting tool according to claim 17 wherein the first moderate roughing sinusoidal cutting edge has a first finishing amplitude, the first roughing sinusoidal cutting edge has a first roughing amplitude, and the first roughing amplitude being greater than the first moderate roughing amplitude.

19. A rotary cutting tool comprising:
   a cutting tool body comprising a cutting end, and the cutting tool body comprising a cutting portion adjacent to the cutting end thereof;
   the cutting portion comprising a first blade comprising a first finishing cutting portion and a first roughing cutting portion adjacent to the first finishing cutting portion, and the cutting portion comprising a second blade comprising a second finishing cutting portion and a second roughing cutting portion adjacent to the second finishing cutting portion; and
   the first finishing cutting portion overlapping the second roughing cutting portion and the first roughing cutting portion overlapping the second finishing portion,
   wherein the cutting tool body has a central longitudinal axis, and each one of the first blade and the second blade having a generally helical orientation and are disposed at an angle between about 35 degrees and about 45 degrees relative to the central longitudinal axis of the cutting tool body.

* * * * *